US011952806B2

(12) United States Patent
Hunt et al.

(10) Patent No.: US 11,952,806 B2
(45) Date of Patent: Apr. 9, 2024

(54) MOTOR VEHICLE LATCH, IN PARTICULAR A MOTOR VEHICLE DOOR LATCH

(71) Applicant: Kiekert AG, Heiligenhaus (DE)

(72) Inventors: Rob Hunt, Davisburg, MI (US); Scott Brown, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 120 days.

(21) Appl. No.: 17/715,181

(22) Filed: Apr. 7, 2022

(65) Prior Publication Data

US 2023/0323709 A1 Oct. 12, 2023

(51) Int. Cl.

| | |
|---|---|
| ***E05B 81/16*** | (2014.01) |
| ***E05B 77/26*** | (2014.01) |
| ***E05B 77/28*** | (2014.01) |
| ***E05B 81/06*** | (2014.01) |
| ***E05B 81/34*** | (2014.01) |
| ***E05B 83/36*** | (2014.01) |
| *E05B 15/04* | (2006.01) |

(52) U.S. Cl.

CPC .............. *E05B 81/16* (2013.01); *E05B 77/26* (2013.01); *E05B 77/28* (2013.01); *E05B 81/06* (2013.01); *E05B 81/34* (2013.01); *E05B 83/36* (2013.01); *E05B 2015/041* (2013.01)

(58) Field of Classification Search

CPC .......... E05B 81/06; E05B 81/16; E05B 81/28; E05B 81/32; E05B 77/22; E05B 77/24; E05B 77/245; E05B 77/26; E05B 77/28; Y10T 292/1082; Y10T 292/1047; Y10S 292/23; Y10S 292/65

See application file for complete search history.

(56) References Cited

U.S. PATENT DOCUMENTS

| | | | | |
|---|---|---|---|---|
| 4,440,006 | A | 4/1984 | Kleefeldt | |
| 5,537,848 | A | 7/1996 | Grzanka et al. | |
| 2010/0235058 | A1 * | 9/2010 | Papanikolaou | E05B 81/64 701/49 |

(Continued)

FOREIGN PATENT DOCUMENTS

| | | | |
|---|---|---|---|
| DE | 102016121199 | A1 | 5/2018 |
| DE | 102018109899 | A1 | 10/2019 |

(Continued)

*Primary Examiner* — Christine M Mills
*Assistant Examiner* — Christopher F Callahan
(74) *Attorney, Agent, or Firm* — Renner, Otto, Boisselle & Sklar, LLP

(57) ABSTRACT

A motor vehicle latch, in particular a motor vehicle door latch, is equipped with a locking mechanism consisting substantially of a catch and a pawl. An electromotive drive for a coupling lever is further provided as part of a power locking unit. In addition, a first operating lever is provided, wherein in the “unlocked” position of the power locking unit, said first operating lever works on the coupling lever that is then engaged in order to open the locking mechanism, and wherein in the “locked” position of the power locking unit, said first operating lever performs an idle stroke relative to the coupling lever that is then disengaged. According to the invention, the electromotive drive works with a linear thrust member on the coupling lever, wherein the linear thrust member is held in at least one position with the aid of a blocking levers).

19 Claims, 5 Drawing Sheets

(56) References Cited

U.S. PATENT DOCUMENTS

| | | | | |
|---|---|---|---|---|
| 2011/0204673 | A1* | 8/2011 | Cumbo | E05B 81/06 70/141 |
| 2011/0214460 | A1* | 9/2011 | Byun | E05B 85/02 70/91 |
| 2019/0271180 | A1* | 9/2019 | Sardelli | E05B 81/14 |

FOREIGN PATENT DOCUMENTS

| | | | | |
|---|---|---|---|---|
| WO | WO-0019045 | A1 * | 4/2000 | E05B 47/00 |
| WO | WO-2014082175 | A1 * | 6/2014 | E05B 77/26 |

* cited by examiner

MOTOR VEHICLE LATCH, IN PARTICULAR A MOTOR VEHICLE DOOR LATCH

FIELD OF DISCLOSURE

The invention relates to a motor vehicle latch, in particular a motor vehicle door latch, comprising a locking mechanism substantially consisting of a catch and a pawl, further comprising an electromotive drive for electrically powered release or for coupling and uncoupling of a coupling lever as part of a power locking unit. A single electromotive drive can achieve powered release and powered locking functions in conjunction with a logic control module. The electromotive drive unit can be operated by the logic control module at two or more levels of thrust in both directions. In one direction the operation serves to release the locking mechanism to open the door, which is referred to as power release. In the other direction the operation serves to execute a locking of the mechanical release for safety or security, which is referred to as power locking.

The power locking unit can be a central locking unit, an anti-theft unit or also a child lock unit or a combination of individual or all of the mentioned units. In all of these cases, the electromotive drive works on the coupling lever, which in turn is part of the power locking unit. The coupling lever can be engaged with the aid of the electromotive drive. This corresponds to the "unlocked" position of the power locking unit. However, if the coupling lever is disengaged with the aid of the electromotive drive, this pertains to the "locked" functional position of the power locking unit. The invention is based on the knowledge that when the coupling lever is engaged, the first operating lever can directly or indirectly open the locking mechanism via the coupling lever that is engaged. In contrast, the disengaged coupling lever corresponds to a correspondingly interrupted and open operating lever chain, so that actions on the first operating lever are ineffective compared to the locking mechanism.

BACKGROUND OF DISCLOSURE

The generic state of the art according to DE 10 2018 109 899 A1 relates to a motor vehicle latch which is used in particular for the rear door of a vehicle. The associated coupling lever can be moved into different positions. A first position pertains to the "anti-theft engaged and central locking engaged" functional position. A second position, on the other hand, is identified with the "anti-theft disengaged and central locking engaged" functional position. In addition, a possible third position is also observed, which pertains to the "anti-theft and central locking disengaged" functional position. In this way, correct positioning of the coupling lever is to be ensured overall. This has proven itself in principle.

However, improvements are possible at this point, in particular in the event that the motor vehicle latch in question and in particular the motor vehicle door latch is used on or in a rear side door of the motor vehicle. Such rear side doors are regularly equipped with a power locking unit designed as a child lock unit. In the "child lock on" function position, the power locking unit is "locked" and consequently the coupling lever is disengaged. If in such a case, for example, an inner door handle belonging to the rear side door is acted upon by a child, this action is ineffective because the operating lever chain is then interrupted and consequently the motor vehicle door in question and in particular the motor vehicle side door cannot be opened.

In contrast, the "child lock off" function position corresponds to the power locking unit being "unlocked." Via the consequently engaged coupling lever, an impact on the inside door handle is transmitted to the first operating lever, which in turn acts on the engaged coupling lever so that the pawl can then be lifted from its engagement with the catch by the operating lever chain that is closed in this way. The catch opens with the aid of a spring and releases a previously caught locking pin. As a result, the relevant motor vehicle door and in particular the rear side door can then be opened.

Modern motor vehicles are often equipped with an electric opening drive capable of power release. This electric opening drive is ultimately controlled by operating a switch or by remote control. For this purpose, a vehicle user may act on an outside door handle equipped with a sensor or switch which determines the action. The switch operation can be determined by a control unit and transmitted to the associated electric opening drive. This is particularly convenient and noise-optimized.

In the course of a logic control of the individual motor vehicle latches and in particular motor vehicle door latches in such a motor vehicle, there is a need to generally also be able to operate a power locking unit and in particular a child lock unit remotely or by operating a switch. Appropriate approaches already exist here with the teaching according to DE 10 2016 121 199 A1. This is because a locking device for a motor vehicle with a motor vehicle latch is described at this point. In addition, a functional unit which also works as a child lock has been implemented. In order to activate or deactivate the child lock, it is necessary to pull the inside door handle several times or to operate a corresponding switch. This is also relatively complex in view of the drive provided at this point with the associated Bowden cable. This is where the invention starts from.

SUMMARY OF DISCLOSURE

The invention is based on the technical problem of further developing such a motor vehicle latch and in particular a motor vehicle door latch in such a way that operation is simplified and, at the same time, a structurally simple design is observed.

To solve this technical problem, a generic motor vehicle latch and in particular a motor vehicle door latch is characterized within the scope of the invention in that the electromotive drive for the coupling lever works with a linear thrust member on the coupling lever, wherein the linear thrust member is held in at least one position with the aid of a blocking lever. The linear thrust member can preferably be held in three different positions. In a fully retracted state, the linear thrust member operates the pawl to electrically release the latch. The linear thrust member in a fully extended state displaces the coupling lever and locks the latch. Finally, the linear thrust member in a partially retracted basic position contacts neither the coupling lever or the pawl.

In other words, according to the invention, the two different functional positions of the coupling lever in the sense of "engaged" and "disengaged" are realized and implemented in such a way that a portion of travel of the linear thrust member is utilized to operate the coupling lever, whereas the balance of the linear thrust member travel is utilized to achieve an electric release. The coupling lever is acted upon with the aid of this linear thrust member. In doing so, the linear thrust member—nomen est omen—performs a linear movement that is derived from an electric motor belonging to the drive, usually including a gear mechanism. This linear movement is transmitted to the thrust member, which in turn is moved in the linear direction and, during this process, works in a thrusting manner on the coupling lever or the pawl, depending on the direction of motion from the basic position.

As a result, the coupling lever is at least transferred from its engaged position to the disengaged position. This can be done against the force of a spring biasing the coupling lever in the direction of its engaged position. In most cases, the linear thrust member can also be withdrawn with the aid of the electric motor. The consequence of this is that the coupling lever (usually spring-assisted) is then transferred back from its previously assumed disengaged position to the engaged position.

In principle, however, it is also possible for the linear thrust member to be returned to its non-extended basic position supported by spring force when there is no action on the part of the electric motor. This usually pertains to the "engaged" position of the coupling lever. The coupling lever then follows this spring-assisted movement. The assumption of the extended position of the linear thrust member then takes place against the force of the spring, either that which acts on the linear thrust member in the direction of the basic position or that which acts on the coupling lever in the direction of its engaged position, or both. In the extended position, the coupling lever is generally "disengaged."

In any case, the linear thrust member generally assumes the two functional resting positions as described above, namely the partially retracted basic position and the fully extended position. The blocking lever now ensures that the linear thrust member is held in at least one of the two aforementioned positions with its aid. In most cases, the design is such that the blocking lever holds and secures the linear thrust member in the basic position.

The procedure is also such that the blocking lever releases the linear thrust member when sufficient linear thrust is applied to overcome the blocking lever during its transitions from the basic position to the extended position. As a result, at least in the extended position of the linear thrust member, the blocking lever cannot (or can no longer) bias the linear thrust member in the basic position.

In order to realize and implement this in detail, the blocking lever is usually equipped with a spring. The spring ensures that the blocking lever is biased in the direction of the linear thrust member basic position. In fact, the blocking lever is usually rotatably mounted in a housing that accommodates the motor vehicle latch. In addition, the blocking lever typically has a blocking lug.

The spring assigned to the blocking lever now ensures that the blocking lever with its blocking lug overlaps the linear thrust member in its basic position. As a result, the transition of the linear thrust member from the basic position to the extended position is associated with a substantially increased linear thrust in the extension direction to overcome the blocking lever being pivoted against the force of its associated spring, so that the blocking lug releases the linear thrust member.

In the extended position, the blocking lug abuts the linear thrust member. The blocking lug on the linear thrust member continues to work with a force exerted on the linear thrust member by the spring assigned to the blocking lever. However, a force vector acting on the blocking lug (in the extended position of the linear thrust member) is directed in such a way that the linear thrust member is no longer acted upon by the blocking lug in the direction of its basic position. As a result, the linear thrust member can be held in the extended position with relatively little force. In operation, as the control module determines a power release is desired, the electromotive unit is energized to provide a full power retraction of the linear thrust member to release the pawl. This is followed by a lower power extension of the linear thrust member to reset the electromotive unit. This low power extension is unable to overcome the blocking lever spring stalling the electromotive unit in the basic position. If the control module determines a power locking is required, the electromotive unit is energized to provide a full power extension overcoming the blocking lever spring and disengaging the coupling lever. From the locked position, either a low powered retraction to unlock or a full powered retraction to not only unlock but fully release and open the door can be applied. It is further possible to apply a full power extension reset after release if locked is the desired state after power release. With the design according to the invention, power locking and power release can be achieved utilizing only a small motor.

The linear thrust member generally has a guide opening for engaging at least one guide pin. The guide pin is usually fixedly connected to the aforementioned housing assigned to the motor vehicle latch. The design is usually such that the guide opening is surrounded by a guide web. The guide pin overlaps the guide web and in this way, ensures that the linear thrust member is not only guided along its completed linear direction during the transition from the basic position to the extended position and back, but also cannot be deflected perpendicular thereto. In addition, the design is usually such that the blocking lever abuts the guide web in question with its blocking lug and interacts with said guide web. As a result, the blocking lug can be placed in a different plane compared to the blocking lever, without undesirable interactions occurring at this point.

The blocking lever is usually arranged adjacent to the linear thrust member so that the blocking lug on the blocking lever can interact as described with the guide web which frames the guide opening in the linear thrust member and protrudes therefrom.

The linear thrust member is also equipped with a stop edge and typically a front stop edge for interaction with a stop pin on the coupling lever. Since the coupling lever is generally arranged in a the path of the linear thrust member, the stop pin protruding from this plane ensures the desired interaction with the linear thrust member or the stop edge on the linear thrust member provided at this point and usually implemented on the front.

The coupling lever, like the linear thrust member, usually has a guide opening. The design is usually such that the guide pin not only extends through the guide opening in the linear thrust member, but also the guide opening in the coupling lever. As a result, the linear thrust member on the one hand and the coupling lever on the other hand can move together and in phase in the linear direction during the transition from the basic position to the extended position of the linear thrust member, wherein the guide pin ensures the longitudinal guidance in this linear direction.

The aforementioned stop pin on the coupling lever, which stop pin interacts with the stop edge on the linear thrust member, now has a dual function—just like the guide pin. In fact, the stop pin abutting the stop edge of the linear thrust member not only ensures that the coupling lever follows and can also follow the linear thrust member during the transition from the basic position to the extended position and back. Rather, the stop pin also engages in a pin guide, which is located in a further second operating lever. The design is such that the stop pin not only engages in the pin guide of the second operating lever in question, but even reaches through it.

In this way, the first operating lever can move with a stop edge against the stop pin on the coupling lever when the linear thrust member is in its basic position. This corresponds to the engaged state of the coupling lever. As a result, the stop edge on the first operating lever is able to move against the stop pin on the coupling lever.

Since the stop pin on the coupling lever engages in the pin guide of the second operating lever, a corresponding action on the first operating lever causes the second operating lever to be carried along in the same pivoting direction by the intermediate stop pin on the coupling lever in the engaged position of the coupling lever. Typically, the first operating lever and the second operating lever are mounted on the same axis, so that the aforementioned pivoting movement on the first operating lever in phase leads to a corresponding pivoting movement on the second operating lever, which in turn opens the locking mechanism. This is because the second operating lever can work directly or indirectly on the pawl as part of the locking mechanism, which is lifted from its engagement with the catch by the pivoting process described. The catch opens with the aid of a spring and releases a previously caught locking pin. As a result, the associated motor vehicle door is opened.

This is expressly intended in the engaged position of the coupling lever and consequently the unlocked position of the power locking unit and, in the example of a child lock as a power locking unit unit, corresponds to the child lock assuming the “child lock off” functional position. This pertains to the unlocked position of the power locking unit and the engaged position of the coupling lever, so that, starting from the first operating lever via the stop pin on the coupling lever and the second operating lever, the operating lever chain can finally open the locking mechanism as described.

The matching linear movement of the linear thrust member as well as the coupling lever in connection with the common guide pin, which extends through both the guide opening of the linear thrust member and that of the coupling lever, provides a compact structure with a reduced number of functional elements. The fact that the stop pin on the coupling lever not only interacts with the linear thrust member to act on the coupling lever, but at the same time ensures a mechanical connection between the two operating levers in the engaged position of the coupling lever and disconnects said connection in the disengaged position of the coupling lever also contributes to this. As a result, the motor vehicle latch according to the invention and in particular the motor vehicle door latch can be implemented in a particularly cost-effective and at the same time functionally reliable manner.

In addition, the motorized remote control makes it possible to realize and implement a child lock function in a simple manner, in particular on rear side doors of motor vehicles. In fact, it is only necessary for this purpose to selectively engage the child lock (child lock on) or disengage it (child lock off) via switches located on the dashboard, for example, or a corresponding menu of a screen control. As a result, electrical operation of the child lock function is possible, in contrast to the variants that have hitherto predominantly been implemented in practice, in which the child lock is realized and implemented via, for example, mechanical slide switches or the like on the associated motor vehicle door.

Since the child lock function is consequently implemented electrically according to the invention, it can also be processed by control technology and mapped in a control unit. It is thus possible, for example, to engage the child lock via the control unit as soon as the associated motor vehicle is moving. It is also possible to disengage the child lock when the vehicle is stationary or only when a corresponding command is given by the driver or other vehicle users. In addition, the child lock can then be disengaged while driving in the event of an accident. A kind of emergency release of the child lock can therefore be implemented and set up. All of this is far superior to previous child locks and can ultimately be traced back to the electrical operation of the child lock within the scope of the invention in combination with a simultaneously functionally reliable, compact and inexpensive structure. Herein lie the essential advantages.

The invention is explained in greater detail below with reference to drawings, which show only one exemplary embodiment. In the drawings:

DETAILED DESCRIPTION

The drawings show a motor vehicle latch which, in the exemplary embodiment, is a motor vehicle door latch. In fact, the motor vehicle door latch is designed as a motor vehicle side door latch, specifically as one which is used on a rear side door of a motor vehicle. Accordingly, the motor vehicle door latch in question has a child lock, as will be explained in more detail below. Of course, this only applies as an example.

Figure 3:
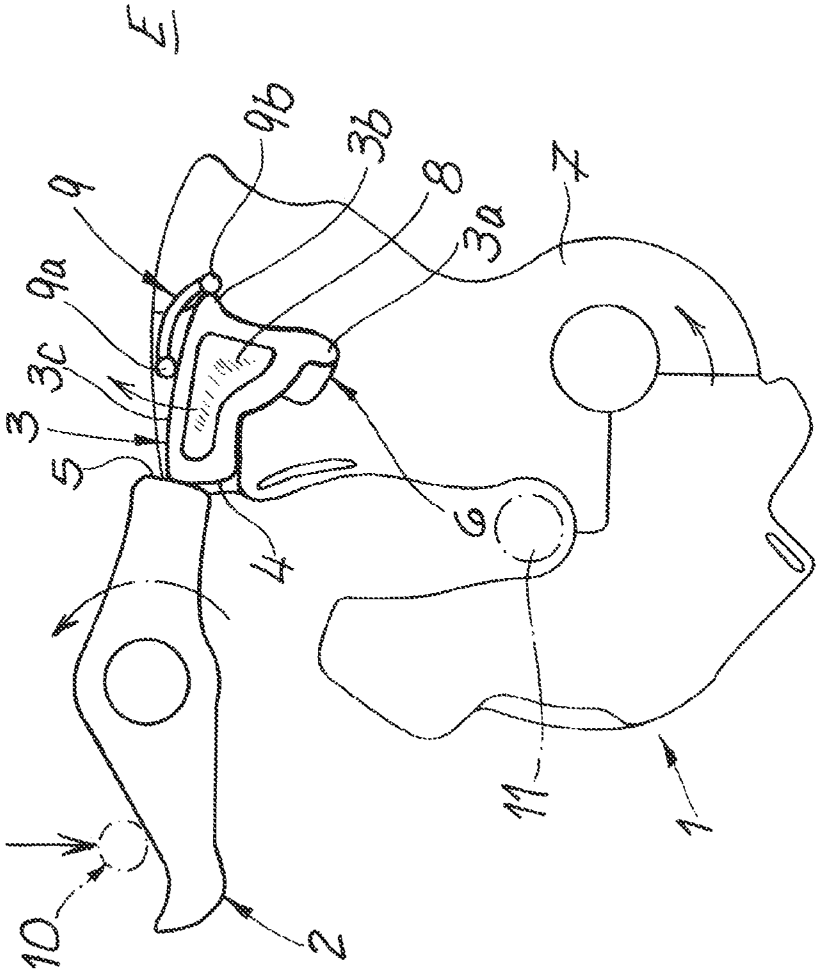
FIG. 3 shows the implemented locking mechanism in detail.

The basic structure of the illustrated motor vehicle door latch includes a locking mechanism 1, 2 substantially consisting of a catch 1 and a pawl 2. The locking mechanism 1, 2 is specially designed as shown in FIG. 3. In fact, the locking mechanism 1, 2 is equipped with a sliding element 3 mounted pivotably on the catch 1 and/or the pawl 2. With the aid of the sliding element 3, which is designed as a ratchet element 3 according to the exemplary embodiment, a particularly low-force opening of the locking mechanism 1, 2 is achieved. In connection with the child lock to be described in more detail below, this is of particular synergetic importance in order to keep the operating forces on an inside door handle of the rear side door of the motor vehicle in question as low as possible and consequently to enable simple operation even for young children.

For this purpose, the ratchet element 3 is mounted on the catch 1 according to the exemplary embodiment. Overall, the sliding element or ratchet element 3 is thereby able to perform pivoting movements relative to the catch 1 in a locking mechanism plane E indicated in FIG. 3. In fact, the locking mechanism plane E is spanned by the two locking mechanisms 1, 2, i.e. the catch 1 in conjunction with the pawl 2.

During an opening process of the locking mechanism 1, 2, the ratchet element 3 essentially performs a pivoting movement in a clockwise direction, as corresponding arrows associated with an opening movement in FIG. 3 make clear. For this purpose, the ratchet element 3 according to the exemplary embodiment is designed in a total of three parts with a bearing foot 3*a*, a load contact 3*b* and a raised edge 3*c*.

It can be seen that the bearing foot 3*a* and the load contact 3*b* as a whole describe a leg of a right angle together with the raised edge 3*c* defining the other leg. As a result, the ratchet element 3 as a whole has an inverted L-shaped design, so that the long L-leg describing the raised edge 3*c* abuts at the end with its abutment surface 4 on a corresponding opposing abutment surface 5 of the pawl 2 in the closed state, as shown in FIG. 3. The two abutment surfaces 4, 5 can be equipped with a reinforcement in the region of the mutual abutment surface 4 or the opposing abutment surface 5. This reinforcement may be a welded-on sheet metal or a plate made, for example, of steel.

The bearing foot 3*a* of the ratchet element 3 engages as a whole in a recess 6 in the catch 1 that forms a bearing, as shown in FIG. 3. In addition, the catch 1 is equipped with a casing 7 which encloses the ratchet element 3 in the form of a pocket. The casing 7 is a plastics casing, in particular a plastics coating. As a result, the ratchet element 3 is predominantly guided both radially and axially relative to the locking mechanism component 1, 2 supporting the ratchet element 3, i.e. relative to the catch 1 according to the exemplary embodiment. A guide extension 8 protruding from the ratchet element 3 and the locking mechanism plane E, which supports the axial and/or radial guidance of the ratchet element 3 and is indicated as a guide extension 8 in FIG. 3, can also contribute to this.

In addition, the ratchet element 3 is equipped with a spring 9. The spring 9 is connected with one end 9*a* to the ratchet element 3 and with its other end 9*b* to the locking mechanism component 1, 2, i.e. specifically the catch 1, which supports the ratchet element 3. In this case, the end 9*a* of the spring 9 on the ratchet element side engages the above-described raised edge 3*c* of the ratchet element 3. In fact, the end 9*a* of the spring 9 on the ratchet element side is connected approximately in the middle to the raised edge 3*c* of the latching element 3.

Finally, it can be seen from the illustration in FIG. 3 that the spring 9 is designed as a separate component. In fact, the spring 9 is a leaf spring which is without force in the curved course shown in FIG. 3. In principle, however, the spring 9 can also be connected in one piece to the ratchet element 3, although this is not shown. It is also conceivable to use a resilient extension of a casing 7, also not shown, of the ratchet element 3 as the spring 9. In any case, the described locking mechanism 1, 2 including a sliding element 3 achieves a particularly low-force opening. This is because the abutment surface 4 and the opposing abutment surface 5 roll off one another. The rolling movement is easy and almost noiseless.

The locking mechanism 1, 2 described in detail above, corresponding to the illustration in FIG. 3, is placed in FIG. 1A to 2B in a plane perpendicular to the plane of the drawing. The overall design is such that a release lever 10 works or can work on the locking mechanism 1, 2 or the pawl 2. In fact, when the locking mechanism 1, 2, which is in the closed state according to the illustration in FIG. 3, is acted on, the release lever 10 ensures that the pawl 2 is pivoted in the counterclockwise direction indicated in FIG. 3. As a consequence of this, the catch 1 is released from the pawl 2 and opens with the assistance of a spring in the clockwise direction also indicated in FIG. 3, so that a previously caught locking pin 11 is released. This then also applies to the associated motor vehicle door, which is generally and not restrictively a rear side door of a motor vehicle.

Figure 1A:
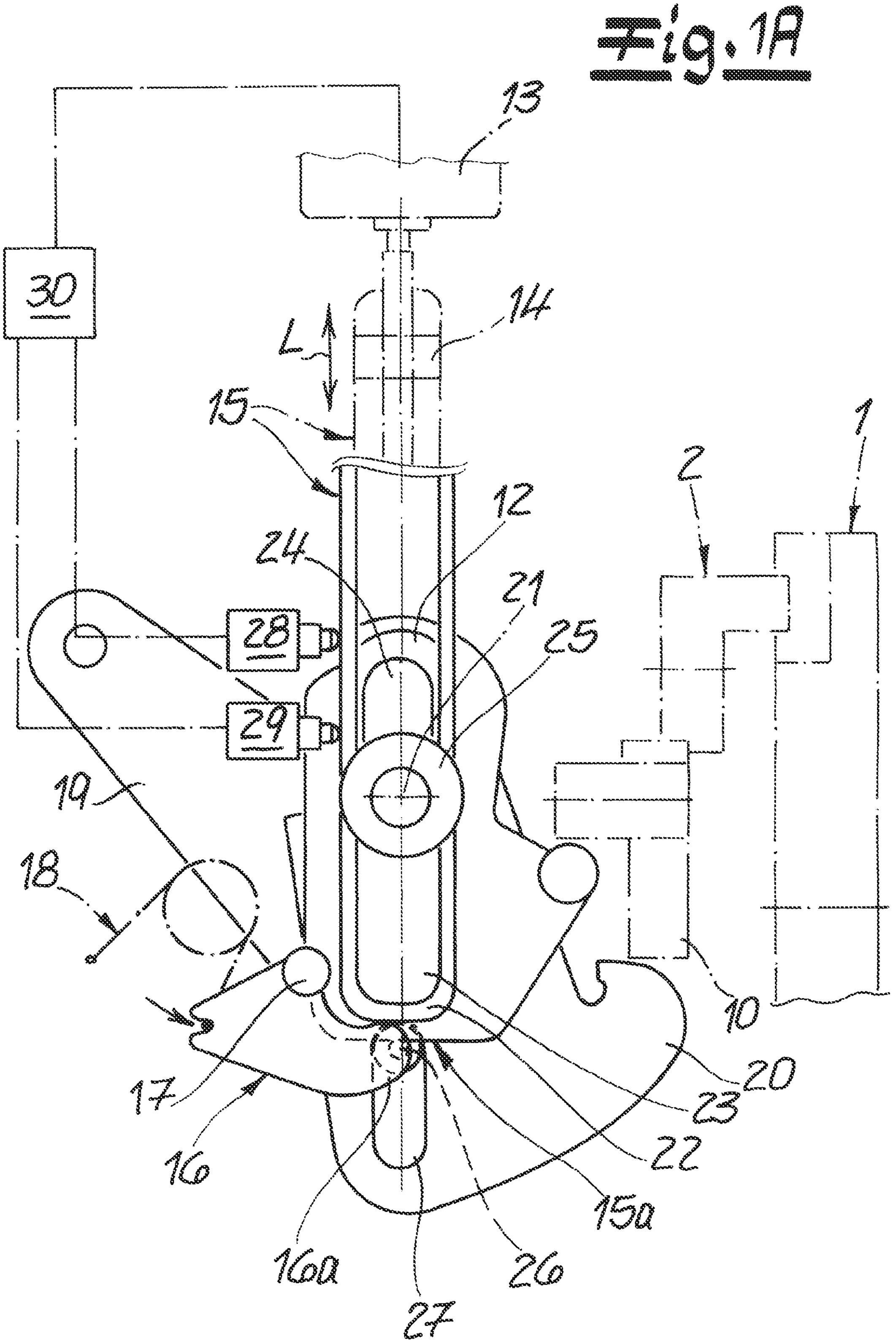
FIGS. 1A and 1B show the motor vehicle latch according to the invention and in particular the motor vehicle door latch in a front view (FIG. 1A) and a rear view (FIG. 1B) as well as in the “unlocked” position of the power locking unit.
Figure 1B:
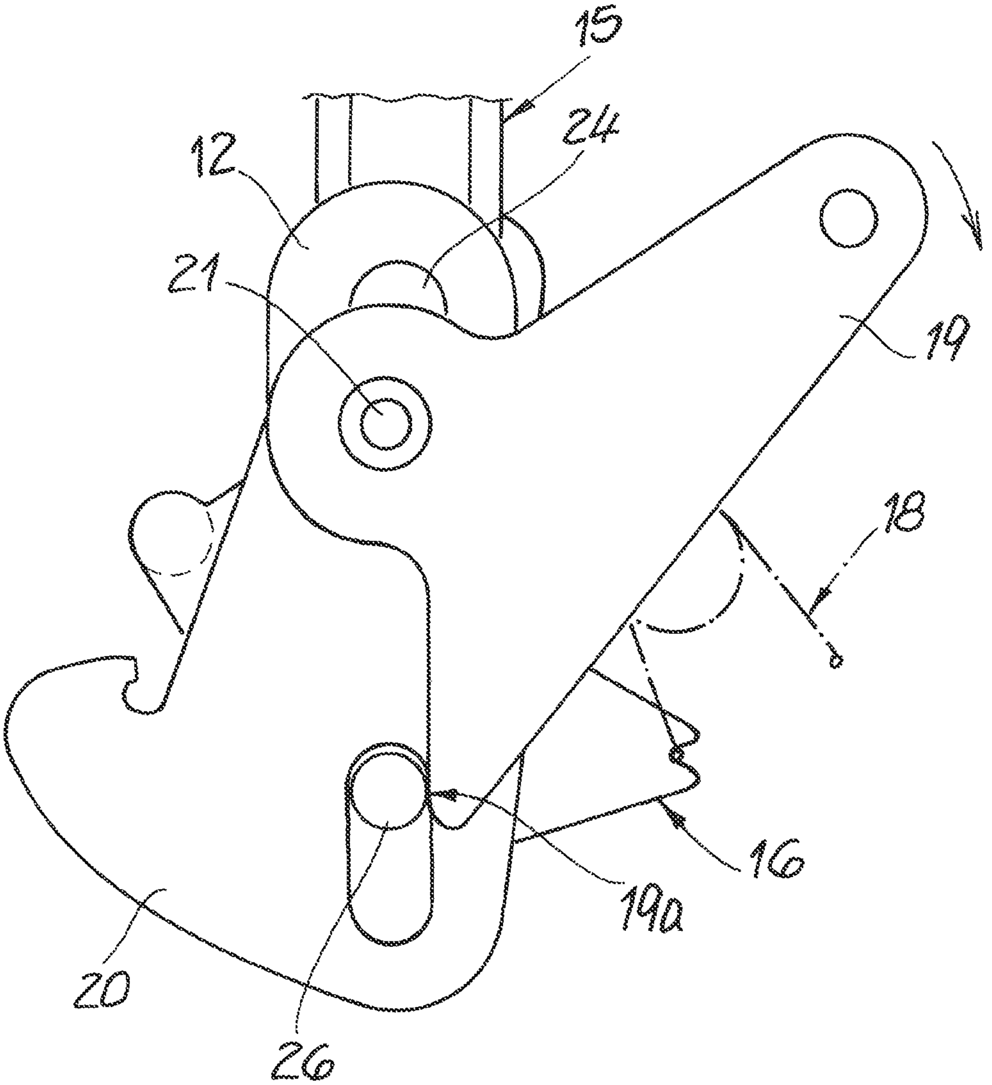

The described opening movement of the locking mechanism 1, 2 assumes that a power locking unit 12 is in its "unlocked" position, as shown in FIGS. 1A and 1B. In fact, according to the exemplary embodiment, the power locking unit 12 has a coupling lever 12*a* as a component. In the variant shown, the power locking unit 12 and the coupling lever 12*a* coincide, which of course only applies as an example and is in no way restrictive.

An electromotive drive 13, 14, 15, 16 for the coupling lever 12*a* can also be seen as part of the power locking unit 12. The electromotive drive 13, 14, 15, 16 has an electric motor 13, which may be equipped with a circumferential thread on its output shaft and which engages in a spindle nut 14. The spindle drive implemented in this way ensures that the spindle nut 14 in FIG. 1A can perform linear adjustment movements in the linear direction L, indicated by a double arrow.

The spindle nut 14 is coupled to a linear thrust member 15, which can also perform the linear movements indicated in FIG. 1A along the double arrow. The representation of the electromotive drive 13, 14, 15, 16 is to be understood overall as schematic and is mainly intended to clarify the principle. In fact, the specific design can be implemented in detail as described in the applicant's application DE 10 2016 121 188 A1.

The electromotive drive 13, 14, 15, 16 then also has a blocking lever 16 which is mounted pivotably about an axis 17. In fact, for this purpose, the axis 17 may be implemented in a housing (not shown in more detail) which as a whole houses the motor vehicle door latch shown and described. In addition, the blocking lever 16 is equipped with a spring 18, which acts on the blocking lever 16 in the direction of the linear thrust member 15. For this purpose, the spring 18 is a leg spring, one leg of which is anchored in the aforementioned and not expressly shown housing, while the other leg of the spring or leg spring 18 engages in a recess of the blocking lever 16 and biases the blocking lever 16 counterclockwise with respect to its axis 17, as indicated by an arrow in FIG. 1A. As a result, a front blocking lug 16*a* of the blocking lever 16 can interact with the linear thrust member 15, as will be described in more detail below.

Figure 2A:
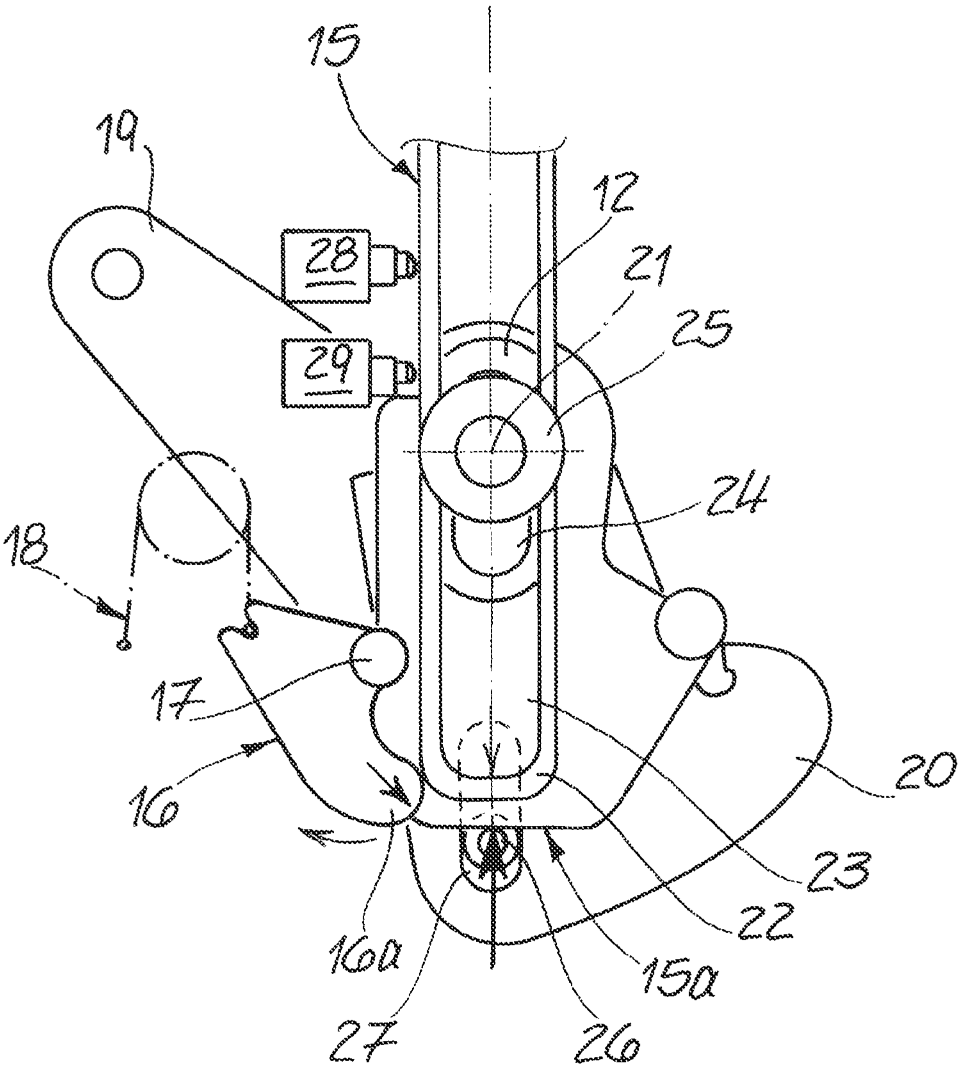
FIGS. 2A and 2B show the motor vehicle latch according to FIGS. 1A and 1B again in a front view (FIG. 2A) and a rear view (FIG. 2B), this time in the “locked” position of the power locking unit.
Figure 2B:
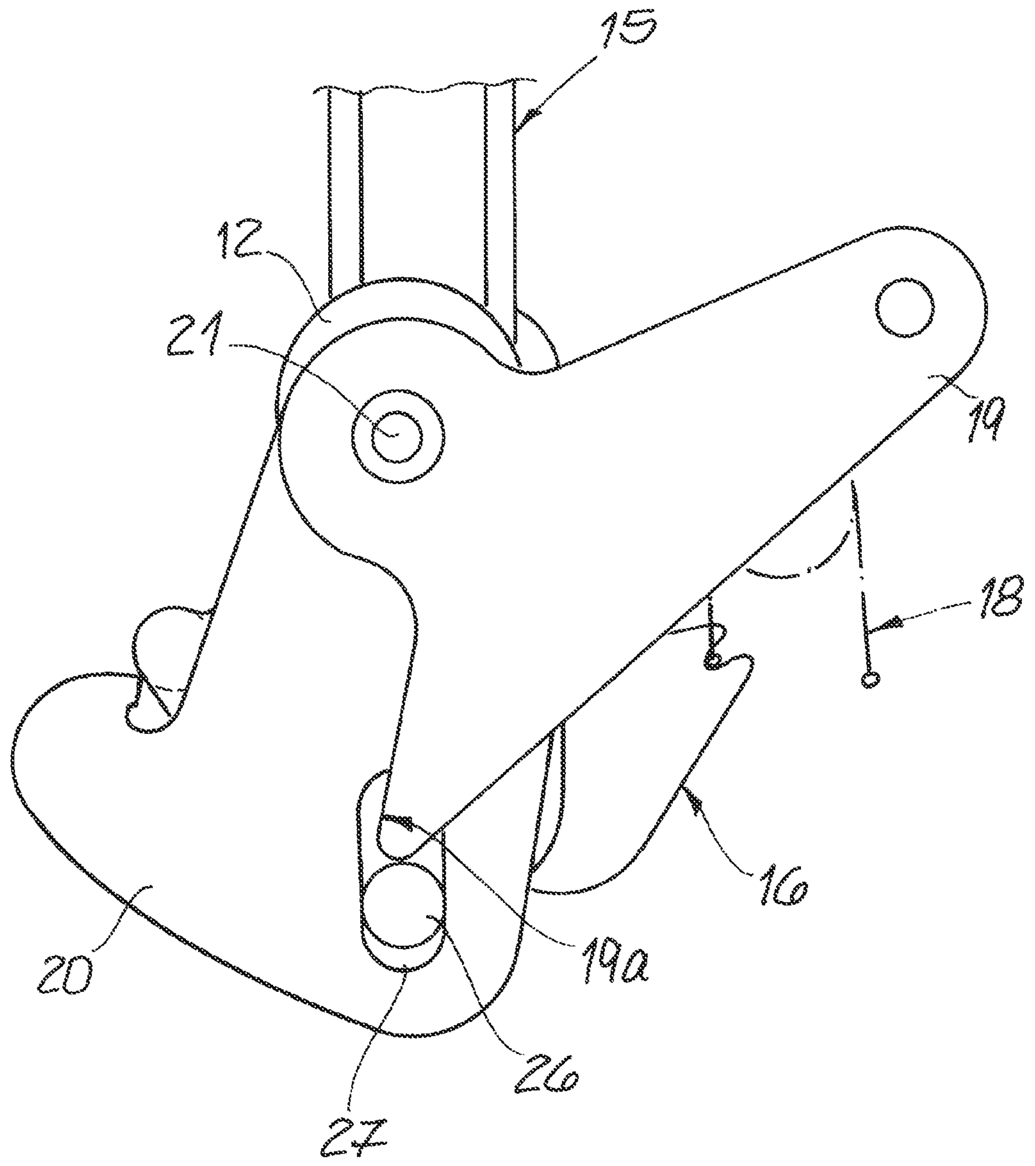

The basic structure also includes a first operating lever 19 and a second operating lever 20, which can best be understood and recognized with the aid of the respective rear view according to FIGS. 1B and 2B. Both operating levers 19, are mounted coaxially relative to one another, realizing a common axis 21. The overall design is such that the first operating lever 19, in the "unlocked" position of the power locking unit 12 shown in FIGS. 1A and 1B, works on the coupling lever 12 that is then engaged. As a result, the locking mechanism 1, 2 as a whole is opened. This is because in the rear view according to FIG. 1B, action on the first operating lever 19 about the axis 21 in the clockwise direction indicated there corresponds to the fact that in this functional position the second operating lever 20 is carried along and can thus work on the release lever 10, which in turn lifts the pawl 2 from its engagement with the catch 1, so that the locking mechanism 1, 2 can be opened. This presupposes that the coupling lever 12 is in the engaged position shown in FIGS. 1A and 1B and consequently the power locking unit 12 assumes its associated "unlocked" functional position. This corresponds to the "child lock off" position if the power locking unit 12 is a child lock.

According to the invention, the electromotive drive 13, 14, 15, 16 now works or can work on the coupling lever 12*a* with recourse to the linear thrust member 15, namely to transfer the coupling lever 12*a* from the engaged position shown in FIGS. 1A and 1B to its disengaged position as shown in FIGS. 2A and 2B. In addition, the linear thrust member 15 is held in at least one of these two positions with the aid of the blocking lever 16.

In fact, the linear thrust member 15 can assume at least two basic positions, namely the basic position shown in FIGS. 1A and 1B and the extended position as shown in FIGS. 2A and 2B. The basic position of the linear thrust member 15 corresponds to the fact that the coupling lever 12*a* is "engaged." In contrast, the "disengaged" functional position of the coupling lever 12*a* pertains to the extended position of the linear thrust member 15.

The blocking lever 16 holds the linear thrust member 15 in the basic position shown in FIGS. 1A and 1B. For this purpose, the blocking lug 16*a* moves against the linear thrust member 15 and specifically a guide web 22 on the linear thrust member 15 which encloses a guide opening 23 in the interior of the linear thrust member 15. During this process, the blocking lug 16*a* is held in abutment with the guide web 22 in question with the aid of the spring 18, because the spring 18 acts on the blocking lever 16 in a counterclockwise direction about its axis 17.

The guide web 22 protrudes from a plane spanned by the linear thrust member 15, in which plane the blocking lever 16 is also arranged. Opposite this plane spanned by the linear thrust member 15, the coupling lever 12*a* is arranged underneath said linear thrust member and the blocking lever 16 is arranged above it. The coupling lever 12*a*, like the linear thrust member 15, now has a further guide opening 24. It can be seen that both guide openings 23, 24 are penetrated by a common guide pin 25. The design is also such that the guide pin 25 in question not only extends through the guide opening 24 in the coupling lever 12*a* and also the guide opening 23 in the linear thrust member 15, but also simultaneously overlaps the guide web 22 of the linear thrust member 15. As a result, the linear thrust member 15 and also the coupling lever 12*a* are guided not only in the linear direction L specified by the double arrow in FIG. 1A, but also perpendicular thereto.

The linear thrust member 15 is equipped with a front stop edge 15*a*. The front stop edge 15*a* of the linear thrust member 15 interacts with a stop pin 26 on the coupling lever 12*a*. In addition, the design is such that the stop pin 26 in question on the coupling lever 12*a* engages in a bolt guide 27 which is implemented and provided in the second operating lever 20. The bolt guide 27 in the second operating lever 20 and the guide opening 24 in the coupling lever 12*a* are designed predominantly in the same direction in the basic position according to FIGS. 1A and 1B. It can also be seen that in this basic position, the stop pin 26 assumes a head-side position within the bolt guide 27, so that the first operating lever 19 can interact with the stop pin 26 with a stop edge 19*a* (see FIG. 1B). As a result, if the first operating lever 19 shown in FIG. 1B is acted on about the axis 21 in the clockwise direction indicated there, the first operating lever 19 carries the second operating lever 20 with it in phase about the common axis 21 via the stop pin 26, so that the second operating lever 20 can work on the release lever 10 to open the locking mechanism 1, 2.

However, if the electromotive drive 13, 14, 15, 16 now ensures that the linear thrust member 15 is transferred from the position in FIG. 1A or the basic position shown there to the extended position according to FIG. 2A, 2B, this corresponds to this a downward movement of the linear thrust member 15. During this process, the front stop edge 15*a* of the linear thrust member 15 carries the stop pin 26 of the coupling lever 12*a*, which abuts therewith, so that the stop pin 26 moves "down" within the pin guide 27 in the second operating lever 20. This can be seen from the arrows in FIG. 2A.

During this process, the guide web 22 also ensures that the blocking lug 16*a* and consequently the blocking lever 16 are pivoted clockwise against the force of the spring 18 about its axis 17, out of the travel path of the linear thrust member 15 or the guide web 22. The consequence of this is that the force exerted by the blocking lever 16 on the linear thrust member 15 and indicated by an arrow in FIG. 2A does not act on the linear thrust member 15 in the direction of its basic position according to FIG. 1A. At the same time, as a result of the displacement of the stop pin 26 within the pin guide 27, the stop edge 19*a* of the first operating lever 19 does not reach (or no longer reaches) the stop pin 26, so that an impact in the functional position according to FIG. 2B results in the first operating lever 19 being ineffective compared to the second operating lever 20. This corresponds to the engaged child lock and consequently the "locked" position of the power unit 12. The coupling lever 12*a* is disengaged accordingly.

Two sensors or switches 28, 29 can also be seen in the figures. The two sensors or switches 28, 29 are connected to a control unit 30, which is only indicated. With the aid of the control unit 30, not only is the electromotive drive 13, 14, 15, 16 controlled, but the basic position of the linear thrust member 15 can also be determined with the aid of the sensor or switch 28, as shown in FIG. 1A. Likewise, the extended position can be sensed in accordance with the illustration in FIG. 2A, specifically with the aid of the sensor or switch 29. In other words, the engaged child lock or disengaged child lock can also be determined via the sensors or switches 28, 29 and transmitted to the control unit 30. The engaged child lock corresponds to the action on the sensor or switch 29, whereas the disengaged child lock acts on the sensor or switch 28.

LIST OF REFERENCE SIGNS

1 Catch
1, 2 Locking mechanism, locking mechanism component
2 Pawl
3 Sliding element, ratchet element
3*a* Bearing foot
3*b* Load contact
3*c* Raised edge
4 Abutment surface
4, 5 Abutment surfaces
5 Opposing abutment surface
6 Recess
7 Casing
8 Guide extension
9 Spring
9*a* End
9*b* End
10 Release lever
11 Locking pin
12 power locking unit
12*a* Coupling lever
13 Electric motor
13, 14, 15, 16 Electromotive drive
14 Spindle nut
15 Linear thrust member

15*a* Abutment edge
16 Blocking lever
16*a* Blocking lug
17 Axis
18 Spring
19 First operating lever
19*a* Abutment edge
20 Second operating lever
21 Axis
22 Guide web
23 Guide opening
24 Guide opening
25 Guide pin
26 Stop pin
27 Pin guide
28 Sensor or switch
29 Sensor or switch
30 Control unit
E Locking mechanism plane
L Linear direction

The invention claimed is:

1. A motor vehicle latch comprising:
- a locking mechanism including a catch and a pawl,
- a power locking unit comprising an electromotive drive and a linear thrust member that is driven by the electromotive drive, and a coupling lever operatively coupled to the linear thrust member,
- a first operating lever, and
- a blocking lever,
- wherein in an unlocked position of the power locking unit, said first operating lever acts on the coupling lever that is then engaged to open the locking mechanism, and wherein in a locked position of the power locking unit, said first operating lever performs an idle stroke relative to the coupling lever that is then disengaged,
- wherein the electromotive drive acts on the linear thrust member to engage with the coupling lever to move the linear thrust member and the engaged coupling member between a basic position when the power locking unit is in the unlocked position where the coupling lever is actable on by the first operating lever, and an extended position when the power locking unit is in the locked position where the coupling lever is not actable on by the first operating lever, wherein the linear thrust member is held in at least one of the basic position or the extended position with the aid of the blocking lever,
- wherein the blocking lever is equipped with a spring which biases the blocking lever in a direction of the linear thrust member,
- wherein, in the unlocked position, the blocking member engages a first side of the linear thrust member to bias the linear thrust member and the coupling member toward the basic position, and
- wherein, in the locked position, the blocking member engages a second side of the linear thrust member to not bias the linear thrust member and the coupling member toward the basic position, wherein the first side and the second side are different.

2. The motor vehicle latch according to claim 1, wherein the blocking lever releases the linear thrust member and the linear thrust member transitions from the basic position to the extended position.

3. The motor vehicle latch according to claim 1, wherein the blocking lever has a blocking lug that interacts with the linear thrust member.

4. The motor vehicle latch according to claim 3, wherein the linear thrust member has a guide web, and the blocking lug abuts the guide web.

5. The motor vehicle latch according to claim 4, wherein the linear thrust member has a further guide opening, and the guide web and the further guide opening commonly receive a guide pin.

6. The motor vehicle latch according to claim 3, wherein the linear thrust member is movable between a basic position and an extended position, and the blocking lug abuts against the linear thrust member when the linear thrust member is in the extended positioned.

7. The motor vehicle latch according to claim 1, wherein the linear thrust member is equipped with a guide opening for engaging at least one guide pin.

8. The motor vehicle latch according to claim 1, wherein the linear thrust member has a stop edge for interaction with a stop pin on the coupling lever.

9. The motor vehicle latch according to claim 1, further comprising a second operating lever in addition to the first operating lever.

10. The motor vehicle latch according to claim 9, wherein the coupling lever has a stop pin that engages in a pin guide of the second operating lever.

11. The motor vehicle latch according to claim 10, wherein the stop pin moves in the pin guide between a first position when the power locking unit is in the unlocked position to permit the first operating lever to directly engage the stop pin to act on the second operating lever to open the locking mechanism and a second position when the power locking unit is in the locked state where the stop pin is spaced from the first operating lever to prevent the first operating lever from acting on the second operating lever.

12. The motor vehicle latch according to claim 9, wherein first operating lever and the second operating lever are mounted coaxially.

13. The motor vehicle latch according to claim 1, further comprising a sliding element mounted pivotably on the catch and/or the pawl.

14. The motor vehicle latch according to claim 1, further comprising a sensor for detecting a position of the linear thrust member, and a control unit that controls the electromotive drive for movement of the linear thrust member based on the detected position provided by the sensor.

15. The motor vehicle latch according to claim 14, wherein the control unit is configured to control the electromotive drive for movement of the linear thrust member in a full power retraction to release the pawl and a low power extension to reset the electromotive drive.

16. The motor vehicle latch according to claim 14, wherein the control unit is configured to control the electromotive drive for movement of the linear thrust member in a full power extension for a power locking, a low power retraction to unlock the locking mechanism, and a full power retraction for full release to open a motor vehicle door.

17. The motor vehicle latch according to claim 16, wherein the control unit further is configured to control the electromotive drive for movement of the linear thrust member, after release, in a full power extension to reset the electromotive drive.

18. A motor vehicle latch comprising:
- a locking mechanism including a catch and a pawl,
- a power locking unit comprising an electromotive drive and a linear thrust member that is driven by the electromotive drive, and a coupling lever operatively coupled to the linear thrust member,
- a first operating lever, a second operating lever in addition to the first operating lever, and a blocking lever, wherein in an unlocked position of the power locking unit, said first operating lever acts on the coupling lever that is then engaged to open the locking mechanism, and wherein in a locked position of the power locking unit, said first operating lever performs an idle stroke relative to the coupling lever that is then disengaged, wherein the electromotive drive acts on the linear thrust member to engage with the coupling lever to move the linear thrust member and the engaged coupling member between a basic position when the power locking unit is in the unlocked position where the coupling lever is actable on by the first operating lever, and an extended position when the power locking unit is in the locked position where the coupling lever is not actable on by the first operating lever, wherein the linear thrust member is held in at least one of the basic position or the extended position with the aid of the blocking lever, and wherein first operating lever and the second operating lever are mounted coaxially.

19. A motor vehicle latch comprising:

a locking mechanism including a catch and a pawl, a power locking unit comprising an electromotive drive and a linear thrust member that is driven by the electromotive drive, and a coupling lever operatively coupled to the linear thrust member, a first operating lever, and a blocking lever, wherein in an unlocked position of the power locking unit, said first operating lever acts on the coupling lever that is then engaged to open the locking mechanism, and wherein in a locked position of the power locking unit, said first operating lever performs an idle stroke relative to the coupling lever that is then disengaged, wherein the electromotive drive acts on the linear thrust member to engage with the coupling lever to move the linear thrust member and the engaged coupling member between a basic position when the power locking unit is in the unlocked position where the coupling lever is actable on by the first operating lever, and an extended position when the power locking unit is in the locked position where the coupling lever is not actable on by the first operating lever, wherein the linear thrust member is held in at least one of the basic position or the extended position with the aid of the blocking lever, wherein the blocking lever has a blocking lug that interacts with the linear thrust member, wherein the linear thrust member has a guide web, and the blocking lug abuts the guide web, and wherein the linear thrust member has a further guide opening, and the guide web and the further guide opening commonly receive a guide pin.

* * * * *